(12) United States Patent
Sixsmith (10) Patent No.: US 9,702,124 B2
(45) Date of Patent: Jul. 11, 2017

(54) HIGH PURITY WATER SYSTEM

(71) Applicant: Georg Fischer LLC, Tustin, CA (US)

(72) Inventor: Thomas G. Sixsmith, Lake Forest, CA (US)

(73) Assignee: Georg Fischer LLC, Tustin, CA (US)

( * ) Notice: Subject to any disclaimer, the term of this patent is extended or adjusted under 35 U.S.C. 154(b) by 0 days.

(21) Appl. No.: 14/220,578

(22) Filed: Mar. 20, 2014

(65) Prior Publication Data

US 2014/0202552 A1 Jul. 24, 2014

Related U.S. Application Data (63) Continuation of application No. 12/738,456, filed as application No. PCT/IB2008/002949 on Nov. 4, 2008, now abandoned.

(Continued)

(51) Int. Cl.
  *E03B 7/12* (2006.01)
  *F24D 17/00* (2006.01)
  (Continued)

(52) U.S. Cl.
  CPC .............. *E03B 7/12* (2013.01); *E03B 7/045* (2013.01); *E03B 7/09* (2013.01); *F16L 41/00* (2013.01);
  (Continued)

(58) Field of Classification Search
  CPC .. E03B 7/12; F24D 17/0078; C02F 2301/046; Y10T 137/85954;
  (Continued)

(56) References Cited

U.S. PATENT DOCUMENTS

| 712,859 A | 11/1902 | Sheermesser |
| 4,021,343 A * | 5/1977 | Tyler .................... B01D 61/08 |
| | | 210/110 |

(Continued)

FOREIGN PATENT DOCUMENTS

| DE | 8915477 | 11/1990 |
| DE | 9302446 | 4/1993 |

(Continued)

OTHER PUBLICATIONS

International Search Report for PCT/IB2008/002949, dated Apr. 20, 2009.

(Continued)

*Primary Examiner* — Atif Chaudry
(74) *Attorney, Agent, or Firm* — Bachman & LaPointe, P.C.

(57) ABSTRACT

A high purity water delivery system has a reservoir (40) of purified water. A distribution line (42) extends downstream from an outlet (44) of the reservoir to a return (46) of the reservoir. A plurality of delivery stations each include an outlet (54') and a diverter (102; 102'; 102"; 102'''). The diverter has an upstream inlet port (104) along the distribution line and a downstream outlet port (106) along the distribution line. The diverter has a supply port (108) downstream of the inlet port and a return port (110) downstream of the supply port. The diverter has a flow restriction (112; 112'; 216) between the supply port and the return port. Each delivery station includes a flow control valve (56') between the outlet on the one hand and the supply port and return port on the other hand.

20 Claims, 10 Drawing Sheets

Related U.S. Application Data (60) Provisional application No. 60/986,168, filed on Nov. 7, 2007.

(51) Int. Cl.
 *E03B 7/04* (2006.01)
 *E03B 7/09* (2006.01)
 *F16L 41/00* (2006.01)

(52) U.S. Cl.
 CPC .... *F24D 17/0078* (2013.01); *C02F 2301/046* (2013.01); *Y10T 137/0318* (2015.04); *Y10T 137/0402* (2015.04); *Y10T 137/2562* (2015.04); *Y10T 137/85938* (2015.04); *Y10T 137/85954* (2015.04); *Y10T 137/87338* (2015.04); *Y10T 137/87539* (2015.04); *Y10T 137/87547* (2015.04)

(58) Field of Classification Search
 CPC ..... Y10T 137/87338; Y10T 137/87539; Y10T 137/2562; Y10T 137/87547
 USPC ......... 137/110, 601.18, 599.11, 563, 601.19; 210/194
 See application file for complete search history.

(56) References Cited

U.S. PATENT DOCUMENTS

| | | | |
|---|---|---|---|
| 4,216,185 A | 8/1980 | Hopkins | |
| 4,347,133 A * | 8/1982 | Brigante | B03C 1/02 |
| | | | 210/138 |
| 4,784,763 A | 11/1988 | Hambleton et al. | |
| 4,939,931 A | 7/1990 | Reeves | |
| 4,969,335 A | 11/1990 | Sasaki et al. | |
| 4,969,991 A | 11/1990 | Valadez | |
| 5,143,049 A | 9/1992 | Laing et al. | |
| 5,324,424 A * | 6/1994 | Hochgatterer | B01D 61/06 |
| | | | 210/123 |
| 5,622,207 A | 4/1997 | Frank | |
| 5,817,231 A | 10/1998 | Souza | |
| 5,855,796 A * | 1/1999 | Joung | B01D 61/10 |
| | | | 210/248 |
| 5,931,196 A | 8/1999 | Bernardi et al. | |
| 6,074,551 A | 6/2000 | Jones et al. | |
| 6,190,558 B1 | 2/2001 | Robbins | |
| 6,315,209 B1 | 11/2001 | Tripp | |
| 6,402,949 B1 * | 6/2002 | Banks | C02F 1/002 |
| | | | 210/257.1 |
| 6,418,969 B1 | 7/2002 | Bertagna | |
| 6,463,956 B2 | 10/2002 | Walker | |
| 6,505,813 B1 | 1/2003 | Horne et al. | |
| 6,508,412 B1 * | 1/2003 | Pergay | B05B 1/14 |
| | | | 239/14.2 |
| 6,579,445 B2 | 6/2003 | Nachtman et al. | |
| 6,719,209 B1 * | 4/2004 | Pergay | F25C 3/04 |
| | | | 239/14.2 |
| 6,827,857 B1 | 12/2004 | Berry | |
| 6,920,897 B2 * | 7/2005 | Poirier | E03B 7/04 |
| | | | 137/561 A |
| 7,017,611 B2 | 3/2006 | Schmitt | |
| 2006/0243647 A1 * | 11/2006 | Mitsis | C02F 1/441 |
| | | | 210/96.1 |
| 2007/0194137 A1 | 8/2007 | Goncze | |

FOREIGN PATENT DOCUMENTS

| | | |
|---|---|---|
| EP | 1431250 A2 | 6/2004 |
| EP | 1845207 A1 | 10/2007 |
| EP | 1882784 A1 | 1/2008 |

OTHER PUBLICATIONS

European Office Action for EP Patent Application No. 08848092.6, dated Feb. 8, 2013.

European Office Action for EP Patent Application No. 08848092.6, dated Aug. 3, 2011.

Claim and Specification amendments filed in EP Patent Application No. 08848092.6, filed Mar. 29, 2011.

\* cited by examiner

HIGH PURITY WATER SYSTEM

CROSS-REFERENCE TO RELATED APPLICATION

This is a continuation application of Ser. No. 12/738,456, national stage filed Apr. 16, 2010, which is the US national stage of PCT/IB2008/002949 and entitled "High Purity Water System", the disclosure of which is incorporated by reference herein in its entirety as if set forth at length, and benefit is claimed of U.S. patent application Ser. No. 60/986,168, filed Nov. 7, 2007, and entitled "High Purity Water System", the disclosure of which is incorporated by reference herein in its entirety as if set forth at length.

BACKGROUND OF THE INVENTION

The invention relates to water systems. More particularly, the invention relates to high purity water systems for laboratory, medical, industrial, and similar uses.

An exemplary high purity water distribution system delivers water to a number of delivery or use points. One exemplary delivery/use point is a faucet. Another exemplary delivery/use point is a water-utilizing piece of laboratory, medical, or industrial equipment.

Despite initial purification, high purity water systems have contaminant growth problems. Stagnant water in a system may provide a hospitable location for any residual contaminant to grow to unacceptable concentration. For example, a typical laboratory faucet is fed by a branch off of a main distribution line. When the faucet is shut-off, there may be stagnant water in the branch even if there is constant flow through the main distribution line. For example, constant flow through the main distribution line may be achieved by providing the main distribution line as a recirculating system.

Figure 1:
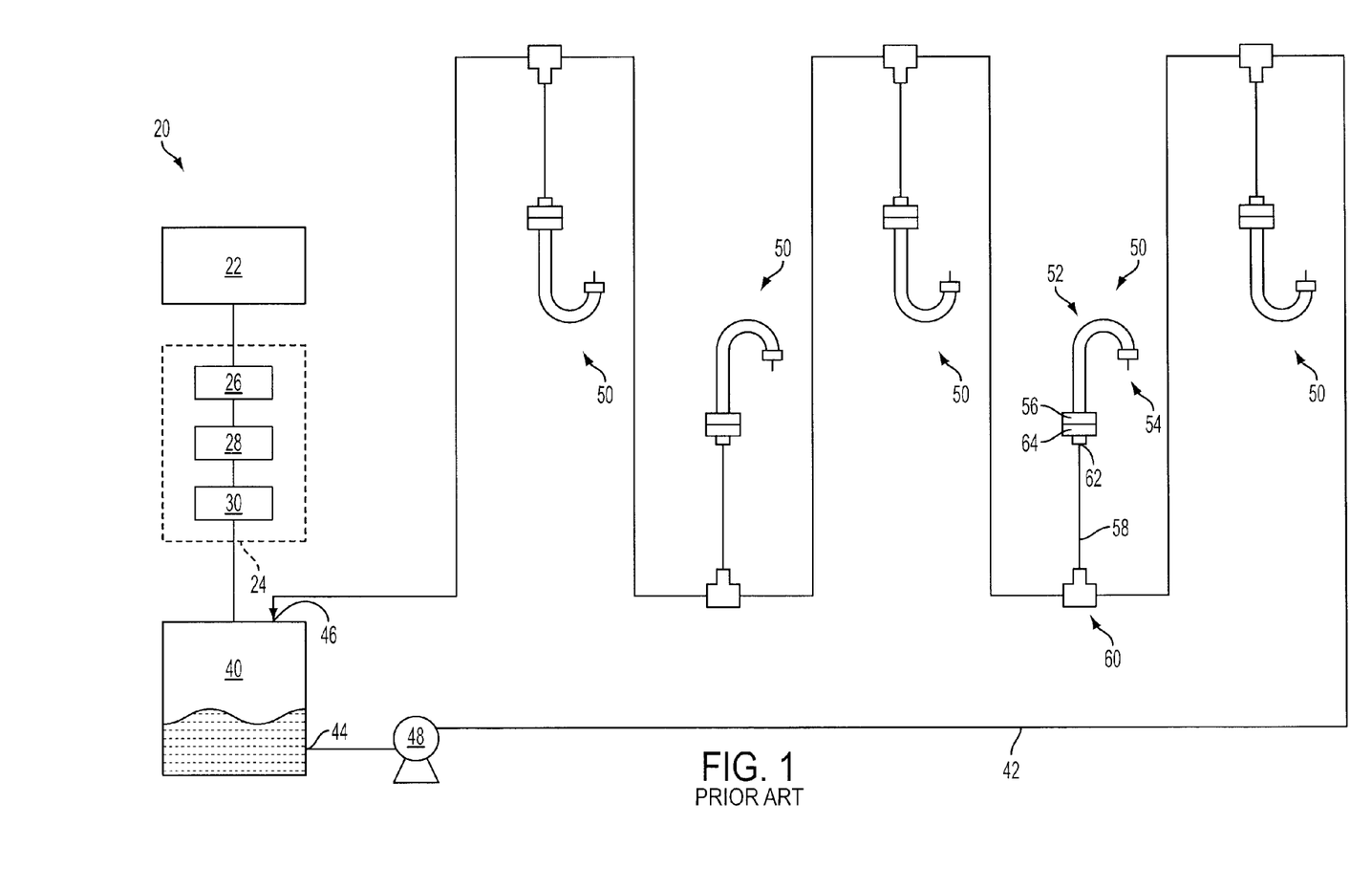
FIG. 1 is a schematic view of a first prior art high purity water distribution system.

FIG. 1 shows a "serpentine" system 20 having an initial non-purified water supply 22 (e.g., municipal water or main water for an industrial facility). A purification system 24 may include: one or more filters 26; thermal, or radiological processing stations 28; and pumps 30. The purification system 24 delivers purified water to a purified water reservoir 40 (e.g., a holding tank). An exemplary main distribution line 42 is a recirculating line from an outlet 44 of the tank 40 to a return 46 of the tank 40. A pump 48 may be located along the main distribution line 42. The distribution line 42 may serpentine through various locations in the laboratory to deliver purified water to various distribution/use points 50.

An exemplary distribution/use point is a faucet 52 having an outlet 54 and a valve 56. The faucet may be at the end of a branch line 58 from the leg of a tee 60 along the distribution line 42. In the exemplary faucet, the branch line 58 connects to a port 62 of the faucet. The exemplary port 62 and valve 56 are along a faucet mounting base 64. Depending upon faucet geometry, at least the distance from the tee 60 to the valve 56 may constitute a dead leg wherein there is little water circulation when the faucet is shut-off. To limit dead leg contaminant growth, one possibility is to leave a residual flow through the faucet. For example, the faucet may have a nominal shut-off condition in which a small flow is discharged (e.g., to waste). Also, or alternatively, limitations may be placed upon the length of the dead leg. For example, with a very short dead leg, residual communication at the tee 60 between the branch line 58 and the main distribution line 42 may sufficiently limit stagnation in the dead leg.

Recent design practices dictate that a dead leg in a hot water system, should not exceed a length greater than six pipe diameters; in a cold system it is any static area, although rule of thumb numbers of three or four diameters are commonly used. This length is often referred to as the "6d" rule and has traditionally been determined by measuring the distance from the centerline of the supplying conduit to the physical blockage on its associated branch. See, e.g., Genova T F, "Microbiological Aspects of Pharmaceutical Water Systems," presented at the High Purity Water Seminar, Institute for International Research, Westin Resort, Miami Beach, Fla., February 1998. Some less conservative gooseneck faucet configurations violate this rule.

Figure 2:
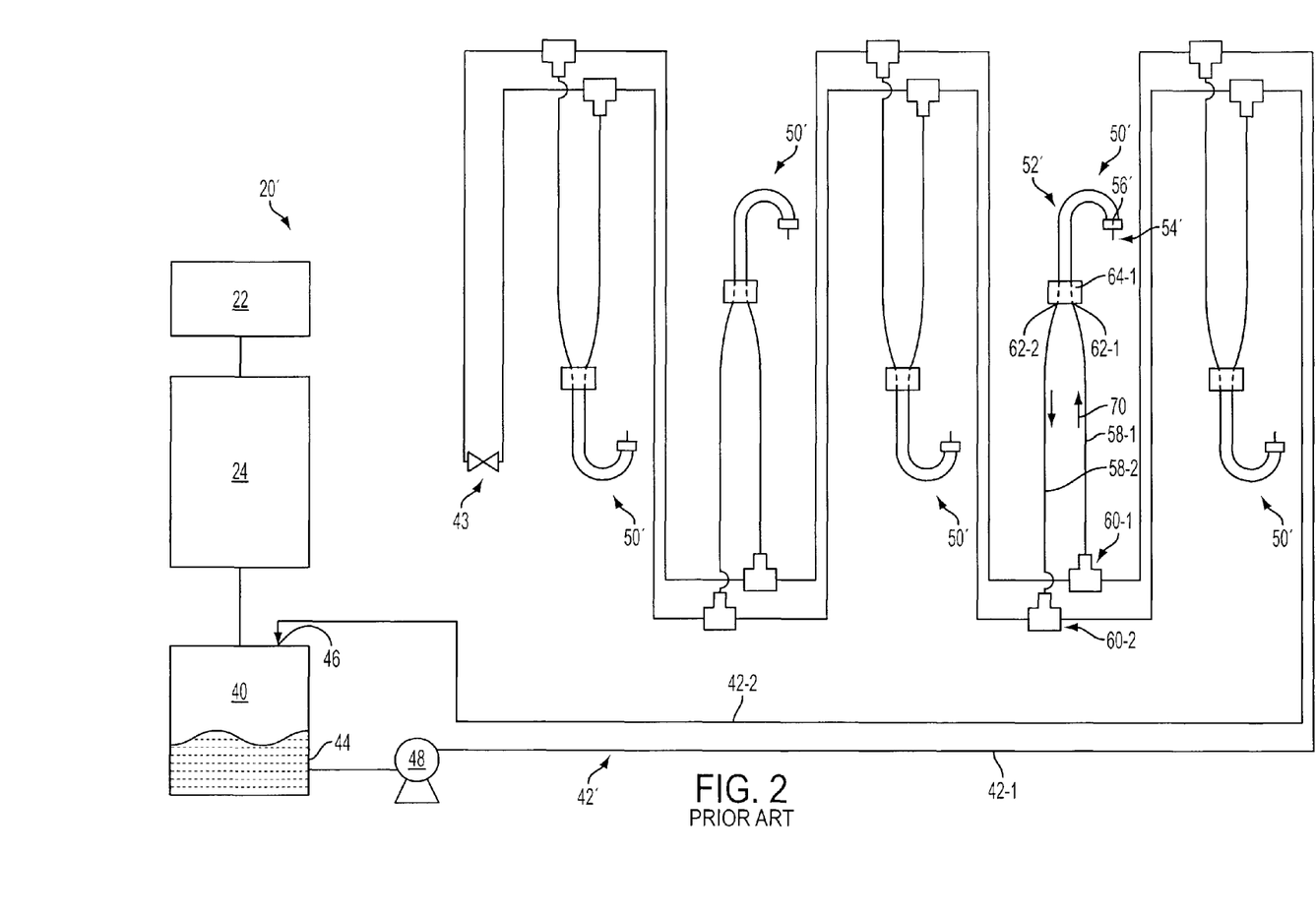
FIG. 2 is a schematic of a second prior art high purity water distribution system.

An alternative system involves the use of recirculating laboratory faucets (RLFs). FIG. 2 shows a "supply/return" system 20' wherein the distribution line 42' is divided by a balancing valve 43 into a supply/outbound leg/line 42-1 and a return/inbound leg/line 42-2. The balancing valve 43 maintains a pressure in the outbound line 42-1 above a pressure in the return line 42-2. In each use point 50', the faucet 52' has a supply port 62-1 and a return port 62-2. The supply port 62-1 is connected to the supply line 42-1 via a line 58-1 and a tee 60-1. The return port 62-2 is connected to the return line 42-2 via a line 58-2 and a tee 60-2. The faucet 52' has an outlet 54' and a valve 56'. With the valve 56' shut-off, there is no discharge flow from the outlet 54'. However, there is a recirculating flow along a recirculating flowpath (faucet loop) 70 from the tee 60-1 through the line 58-1, port 62-1, port 62-2, line 58-2, and tee 60-2 to return to the return line 42-2 and therefrom to the holding tank. By providing this residual recirculating flow, the dead leg may be substantially internalized to the faucet (and reduced to essentially zero with a purpose-configured RLF). This provides a great deal of flexibility in locating the faucet relatively remote of the supply line and return line. When the faucet 52' is open and flow discharging from the outlet 54', there may still be a residual return flow through the line 58-2.

SUMMARY OF THE INVENTION

One aspect of the invention involves a high purity water delivery system. The system has a reservoir of purified water. A distribution line extends downstream from an outlet of the reservoir to a return of the reservoir. A plurality of delivery stations each include an outlet and a diverter. The diverter has an upstream inlet port along the distribution line and a downstream outlet port along the distribution line. The diverter has a supply port downstream of the inlet port and a return port downstream of the supply port. The diverter has a flow restriction between the supply port and the return port. Each delivery station includes a flow control valve between the outlet on the one hand and the supply port and return port on the other hand.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 3:
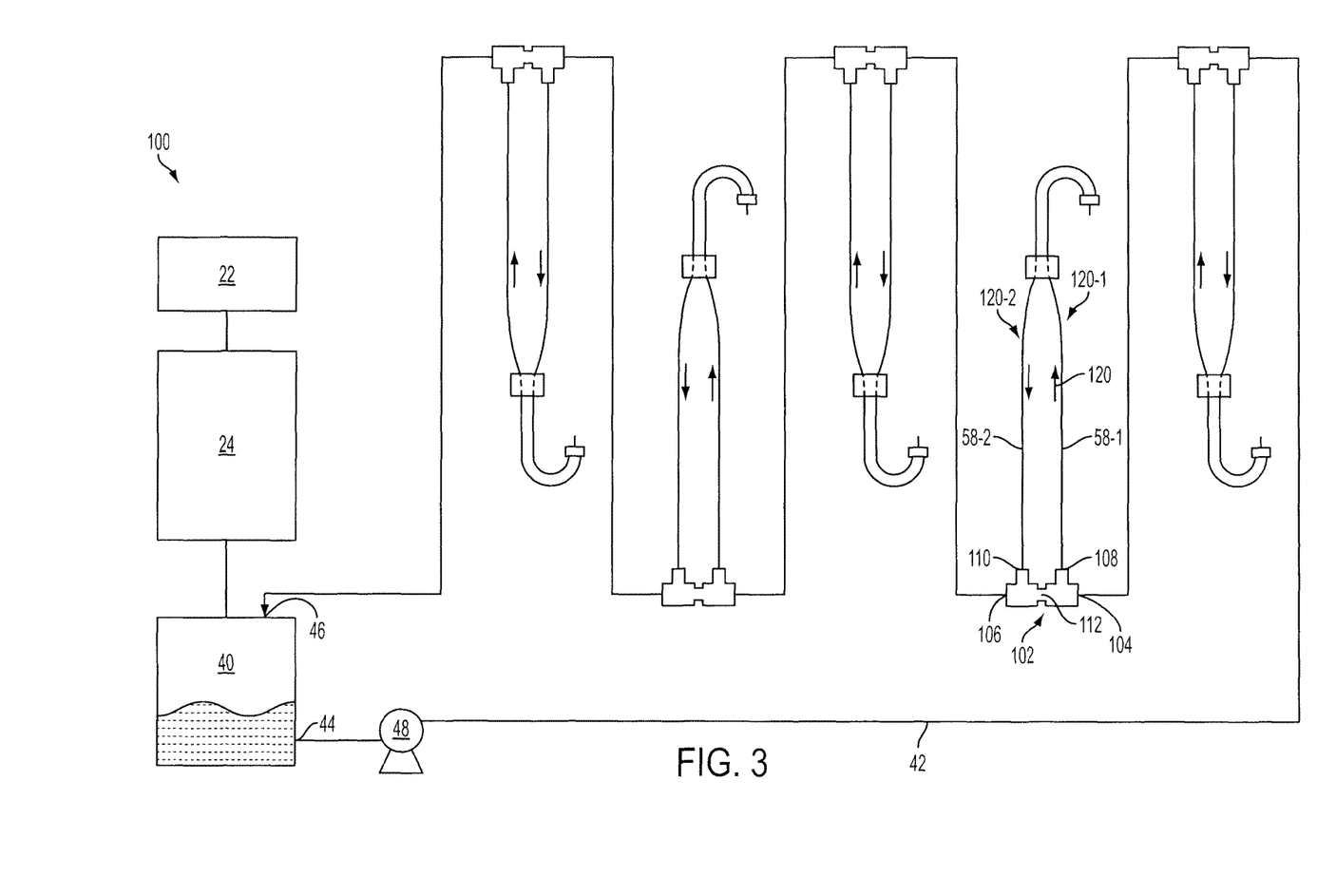
FIG. 3 is a schematic of an inventive high purity water distribution system.

FIG. 3 shows a high purity water distribution system 100 which allows recirculating faucets 52' to be used in a situation other than a supply/return system. This may reduce costs of an initial system construction (e.g., a single line rather than both a supply line and a return line need to be brought proximate each distribution location). It may also allow retrofitting of existing single line serpentine systems.

It is believed that there have been erroneous prior art attempts at retrofitting existing single line serpentine systems with recirculating laboratory faucets. These attempts have involved placing the tee 60-1 immediately upstream of the tee 60-2. In such a situation, the lines 58-1 and 58-2 would effectively operate in parallel rather than as distinct supply and return branches. With the faucet off, the two branches would effectively define parallel dead leg branches.

In the system 100, the tees 60 of the system 20 are replaced by diverters 102. Along the line 42, the diverters 102 have an inlet port 104 and an outlet port 106. The diverters have a supply/take-off port 108 and a return port 110 with a flow restriction 112 therebetween. The supply branch line 58-1 is coupled to the port 108 and the return branch line 58-2 is coupled to the port 110. A recirculating flowpath 120 thus extends: along a supply branch 120-1 from the main flowpath through the diverter supply port 108, and supply branch 58-1 into the faucet to near the valve; and returns via a return branch 120-2 extending through the faucet from near the valve and then through return branch line 58-2 and diverter return port 110. Depending upon the particular kind of RLF, supply and return branches within the faucet may have different extents. The restriction 112 provides a pressure difference across the diverter and thus, across the recirculating flowpath 120.

As noted above, the system 100 may have one or more advantages relative to the system 20 and/or the system 20'. For example, relative to the system 20, the system 100 may be implemented to provide reduced opportunity for contaminant growth. Alternatively or additionally, the system 100 may provide simplification (and cost reduction) of the main distribution line relative to the system 20. For example, the main distribution line of the system 100 may be relatively straight and compact compared to that of the system 20. Whereas the main distribution line of the system 20 may be circuitously routed to proximate the base of each faucet (e.g., extending up into cabinets, benches, or other stations to reduce dead leg length), the main distribution line in the system 100 may be further away from its associated faucets (e.g., remaining entirely in-floor, in-wall, or otherwise being compact and non-circuitous).

Relative to the system 20', the system 100 may essentially cut the required length of main distribution line in half by eliminating the distinction between supply and return legs. This also may essentially halve the associated plumbing labor involved in bringing both the supply and return to desired location relative to each faucet. The restriction 112 is sufficient so that the pressure differential allows sufficient recirculating flow in the recirculating flowpath 120 to control contaminant growth even when the faucet valve is in a full shut-off condition. When the faucet valve is open, there may, advantageously, also be a flow along the flowpath 120, with the flow on the supply branch exceeding the return branch flow by the net flow discharged from the faucet.

An exemplary degree of flow restriction is a 40-60% reduction in flow area (discussed further below).

Figure 4:
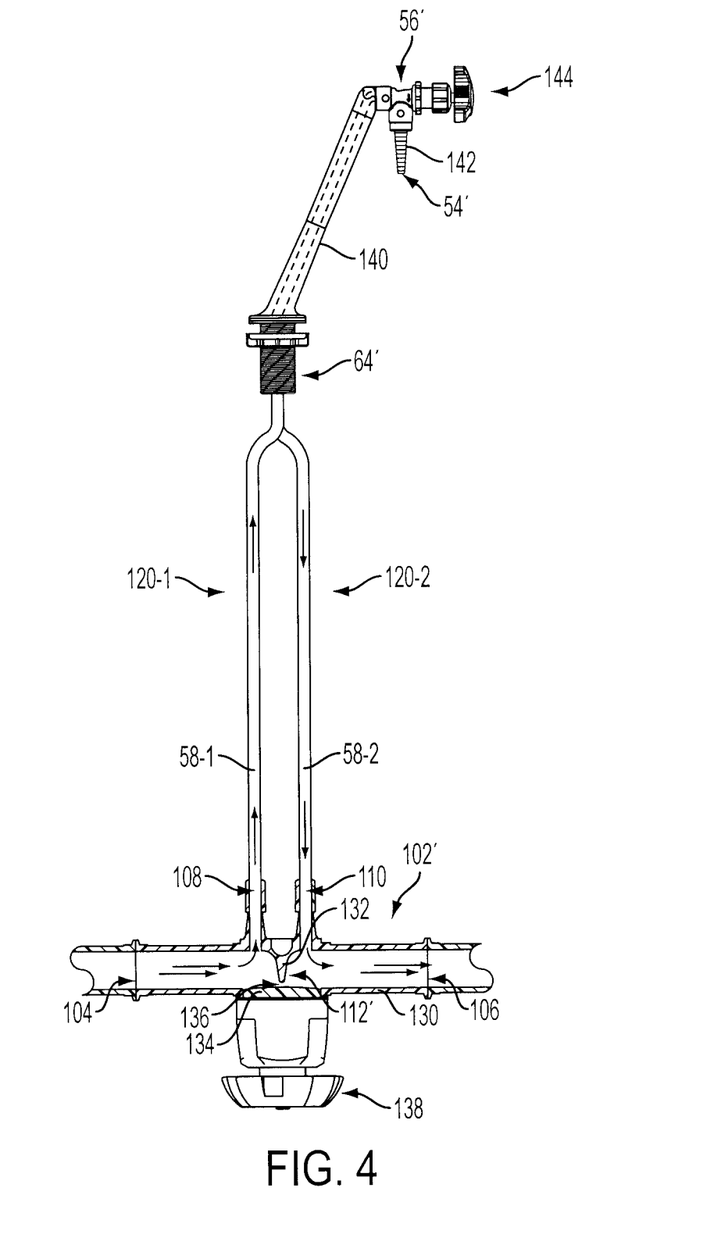
FIG. 4 is a view of a distribution/use point for the system of FIG. 3.

In one family of examples, the diverter is formed as a modified throttling valve wherein the supply and return ports are added. FIG. 4 shows an example of a diverter 102' formed as a modified George Fischer Type 315 Spigot Diaphragm Valve. The diverter 102' includes a body 130. The exemplary restriction 112' is formed by the combination of a weir 132 of the body and a diaphragm 134. The diaphragm may be displaced toward or away from an end of the weir to control the size of a gap 136 therebetween. Exemplary diaphragm control is via an adjustment mechanism such as a manual adjustment knob 138. As is discussed further below, other embodiments involve a fixed orifice. As is discussed further below, an adjustable restriction such as that provided by the diaphragm may be used to simulate performance of a fixed orifice diverter. In the simplified views of FIGS. 4-6, various separate pieces are shown integrated.

The exemplary faucet of FIG. 4 has an angled neck 140 through which two respective branch flowpaths 120-1 and 120-2 extend from the lines 58-1 and 58-2. The two branch flowpaths join at the valve 56'. The outlet 54' is at the lower end of a nozzle/fitting 142 extending downward from the valve 56'. The exemplary valve 56' is a manual valve having an adjustment knob 144. Such a configuration is intended to minimize any dead leg within the faucet. For example, the two separate flowpaths through the neck 140 minimize dead leg between the valve and the main distribution line. The exemplary branch flowpaths are side-by-side, although concentric flowpaths of other faucets may be used. With a vertically downward path from the valve 56' to the outlet 54', water trapping and stagnation therebetween is also limited.

Figure 5:
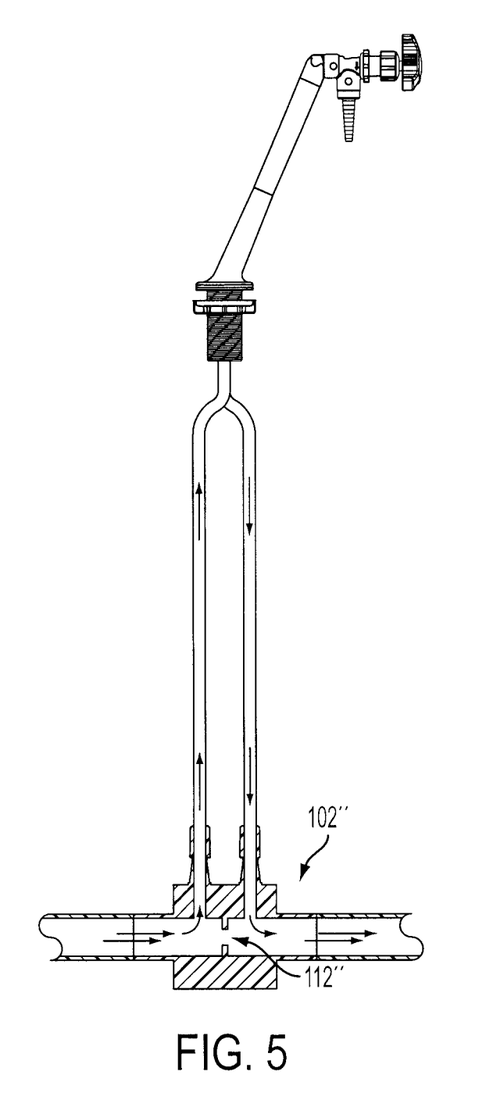
FIG. 5 is an alternate distribution and use point for the system of FIG. 3.

FIG. 5 shows a diverter 102" having a fixed orifice restriction (orifice) 112". The faucet and connection details may be similar to those of FIG. 4.

Figure 6:
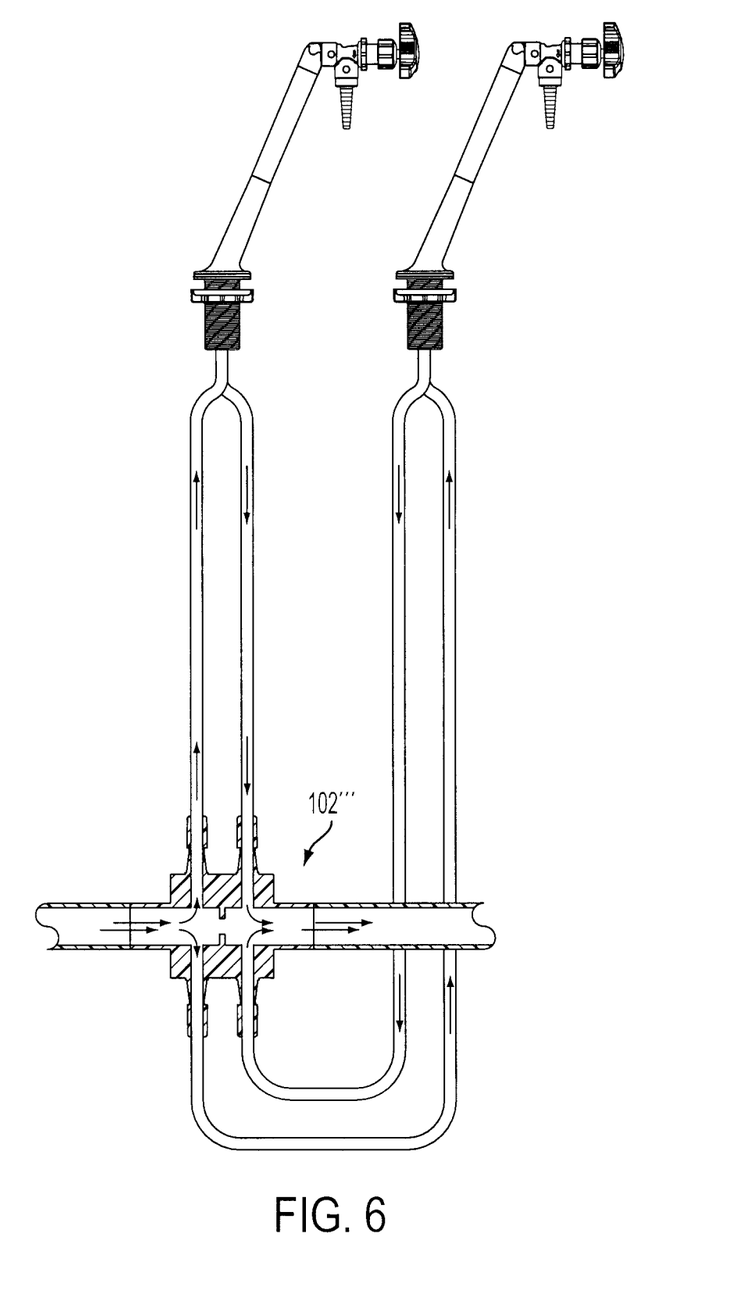
FIG. 6 is a dual distribution and use point for the system of FIG. 3.

FIG. 6 shows a diverter 102'" having two supply ports and two return ports for feeding two faucets. Other details may be similar to those of FIGS. 4 and 5.

Figure 7:
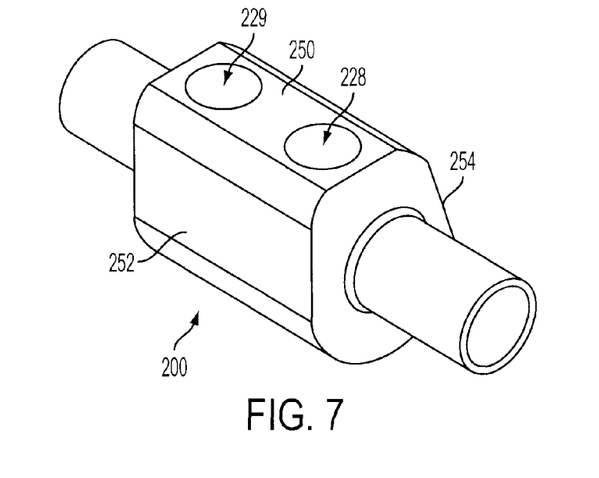
FIG. 7 is a view of a body of a diverter of the distribution and use point of FIG. 5.
Figure 8:
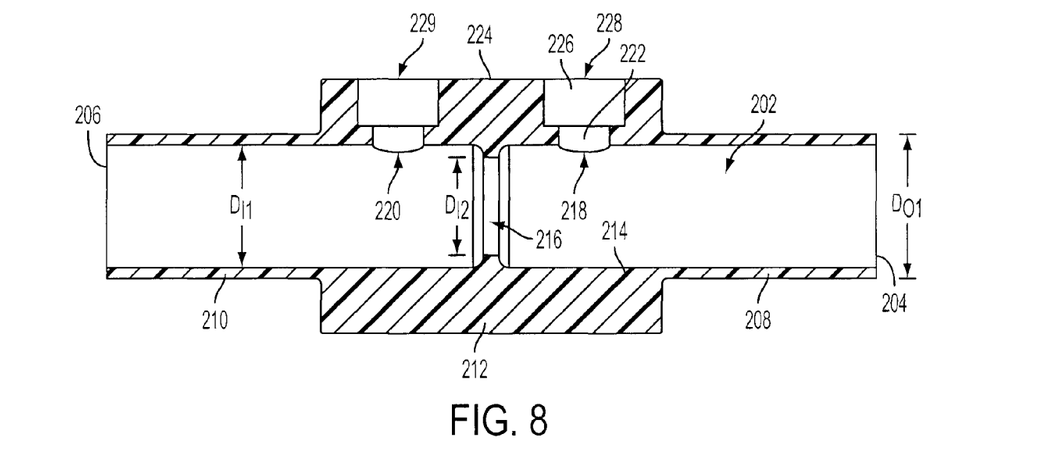
FIG. 8 is a longitudinal sectional view of the body of FIG. 7.

FIGS. 7 and 8 show an exemplary body 200 of the diverter 102". The exemplary body is formed as a single piece of a non-metallic (e.g., polymeric) material. An exemplary body is formed by machining from a stock piece of the material. An exemplary material is rod stock of polyvinylidene difluoride (PVDF). Alternatives may involve molding (e.g., to final form or to an intermediate form finished by machining).

The exemplary body has a main line flowpath portion 202 extending from a first end 204 to a second end 206 (e.g., rims). Tubular neck portions 208 and 210 extend respectively to the rims 204 and 206 from a main body 212. Exemplary portions 208 and 210 have internal diameters $D_{I1}$. The body includes an orifice 216. The exemplary orifice 216 is circular having a diameter $D_{I2}$ smaller than $D_{I1}$. FIG. 8 further shows an outer diameter $D_{O1}$ along the portions 208 and 210. Exemplary $D_{O1}$ and $D_{I1}$ are the same as corresponding diameters of the associated main flowpath piping to which the diverter is coupled.

Figure 9:
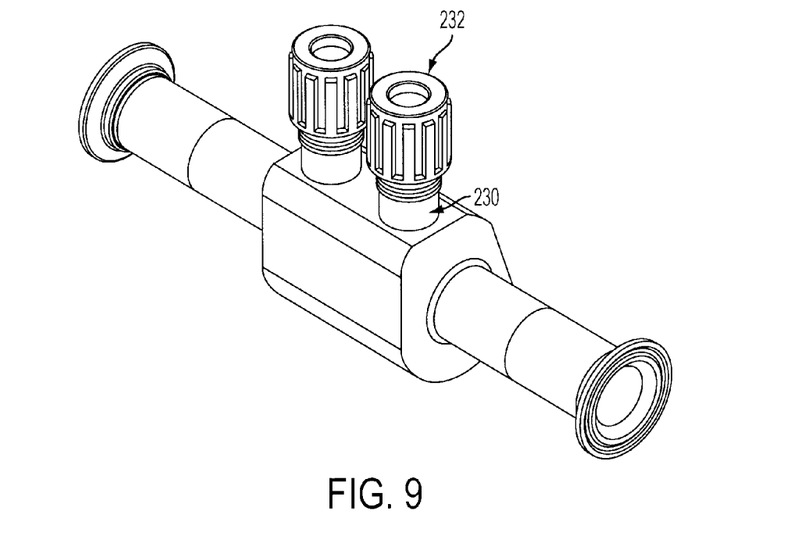
FIG. 9 is a view of a diverter including the body of FIGS. 7 and 8.
Figure 10:
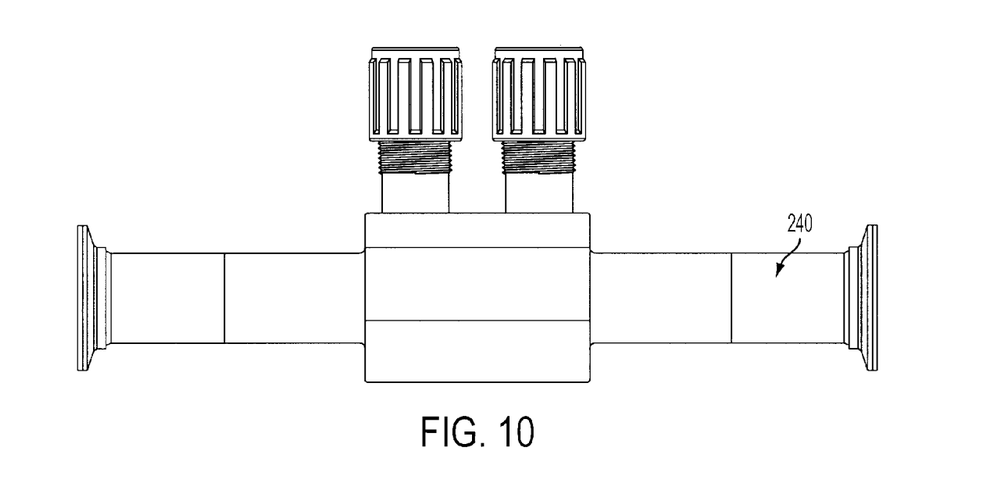
FIG. 10 is a side view of the diverter of FIG. 9.
Figure 11:
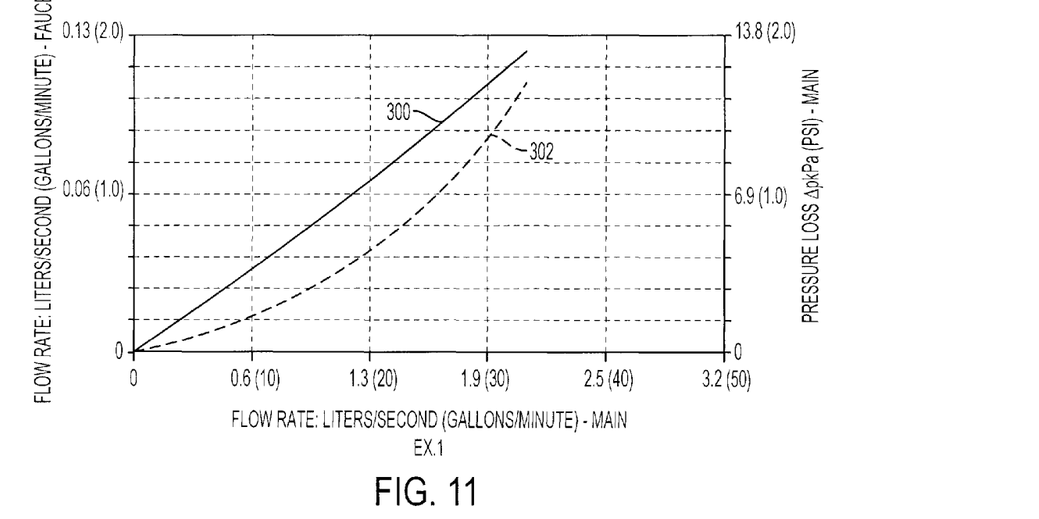
FIGS. 11-14 are flow charts for four fixed orifice diverters
Figure 12:
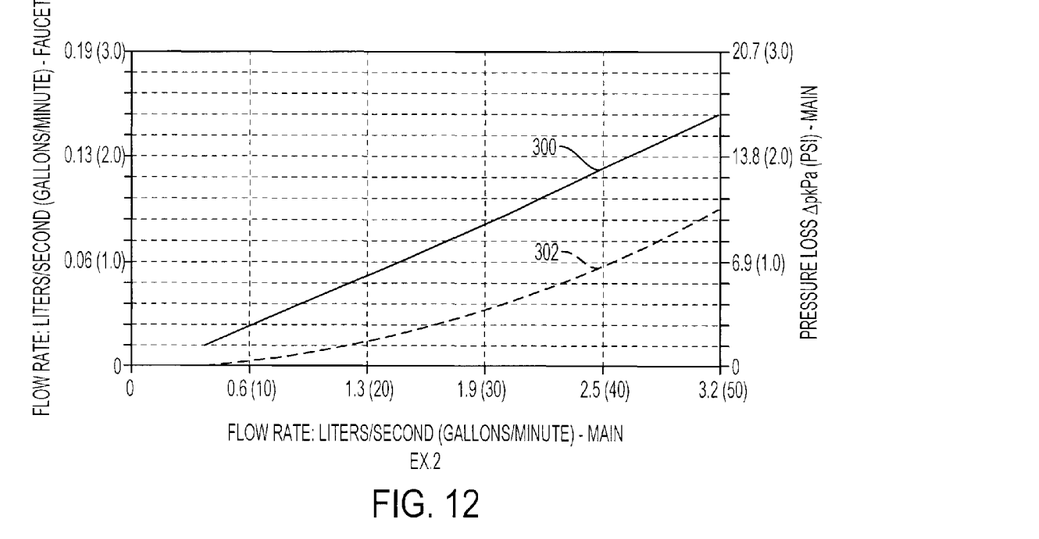
Figure 13:
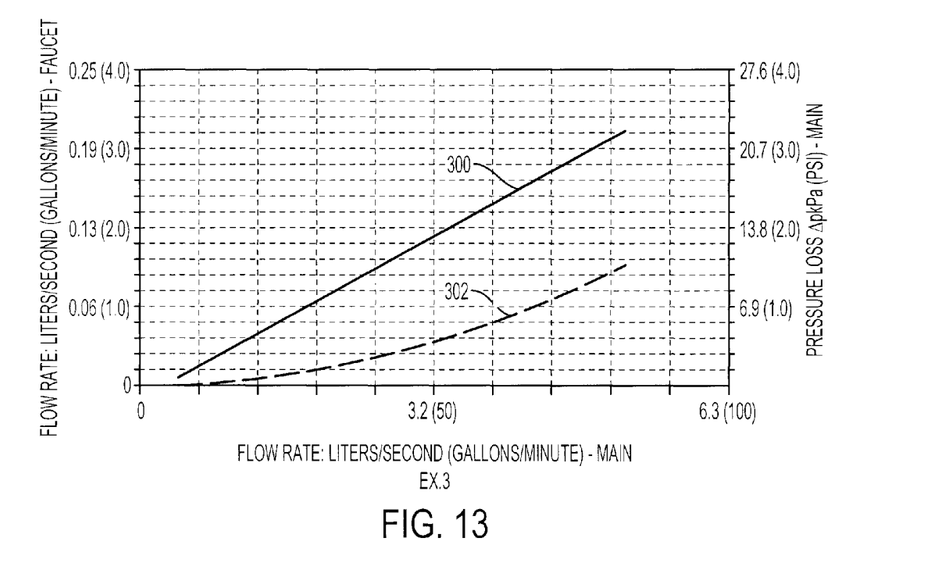
Figure 14:
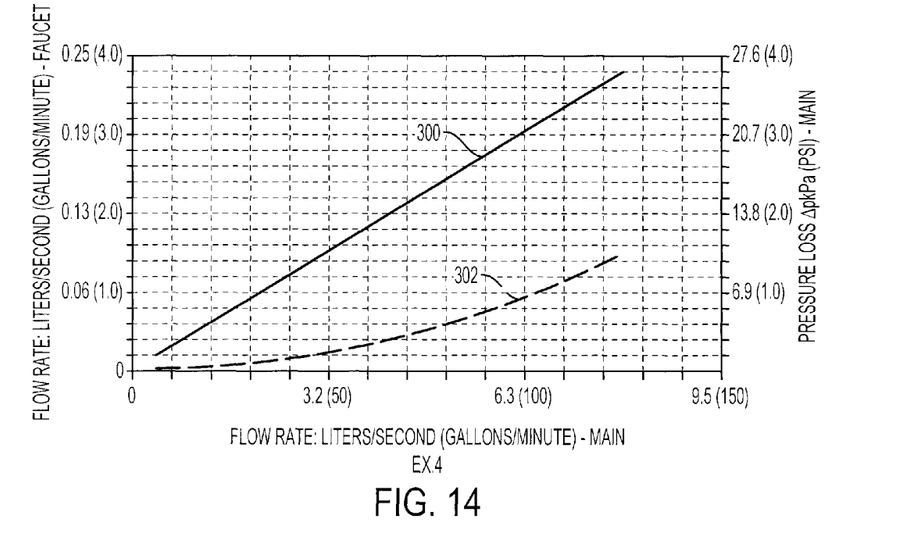

Various relative and absolute diameters are discussed further below. However, if non-circular orifices are used, cross-sectional areas may correspond to those described for circular orifices. Two ports 218 and 220 are formed in the interior surface 214. Extending outward from the respective ports 218 and 220 are first branch portions 222 which may have a diameter corresponding to the necessary branch line ID. Extending to an exterior 224 of the main body from the portions 222 are enlarged regions 226 (which define body ports 228 and 229) for receiving fittings (e.g., flare adapters 230 with nuts 232 shown in FIGS. 9 and 10) for respectively forming the ports 108 and 110. FIGS. 9 and 10 also show sanitary clamp adapter fittings 240 secured at the main body ends 204 and 206 (e.g., via bead- and crevice-free (BCF) welding). The exemplary enlarged regions extend to a top facet/face 250 shown in exemplary orientation facing directly upward. The exemplary body 212 has a pair of lateral facets/faces 252 and 254 facing slightly upward. Port pairs can be formed in any or all of these three faces 250, 252, and 254. Port pairs in two of these faces can provide a two-faucet diverter such as that of FIG. 6. Ports in three of these faces can provide a three-faucet diverter. The at least slightly upward orientation of each of these faces (and the associated ports) prevents the localized water stagnation that might occur with a downward-directed port pair.

Table 1 shows examples of four nominal pipe outer diameters (OD) for the main piping of the system. Table 1 further shows exemplary pipe ID. The particular ID associated with the given nominal OD may vary based upon pipe material and performance standard or schedule. Exemplary pipe materials are PVDF. Alternative materials include polypropylene (PP). However, metal or other pipes may be used.

TABLE 1

| | Ex. 1 | Ex. 2 | Ex. 3 | Ex. 4 |
|---|---|---|---|---|
| Pipe OD (mm) | 32 | 40 | 50 | 63 |
| Pipe ID (mm) | 28 | 35 | 44 | 56 |
| ID area (mm$^2$) | 616 | 962 | 1521 | 2463 |
| Orifice ID (mm) | 20 | 25 | 34 | 38 |
| Orifice area (mm$^2$) | 314 | 491 | 908 | 1134 |
| % Open | 0.51 | 0.51 | 0.60 | 0.46 |

The exemplary orifice diameters of Table 1 were selected to provide a generally favorable balance between sufficiently high recirculating flow diverted from the diverter and sufficiently low pressure differential across the diverter (pressure loss) over a range of main distribution line flows through the diverter. A fuller optimization could involve consideration of factors including or influenced by the numbers of diverters used, the length of the main distribution line (as well as any other factors influencing loss along the main line) and the like. By way of example, with the nominal 50 mm OD pipe, a target flow through the recirculating flowpath 120 was selected as one foot per second (0.30 m/s). With a 34 millimeter orifice, an exemplary main line flow was set at forty gallons per minute (2.5 liter/s) or a velocity of 5.4 fps (1.65 m/s). A resulting flow through the flowpath 120 was one gallon per minute (0.06 liter/sec) or 1.5 fps (0.46 m/s) through nominal 0.625 inch (15.9 mm) OD, 0.50 inch (12.7 mm) ID branch lines. An exemplary faucet-off branch flow is 1.0-5.0 fps (0.30-1.5 m/s), more narrowly, 1.4-2.5 fps (0.43-0.76 m/s), and/or 1.5-5% of a main line flow.

FIGS. 11-14 respectively show curve fits of diverted flow 300 and pressure drop 302 data for the four examples of Table 1. The identified SI units are conversions of the English units of the parentheticals.

In configuring or optimizing a system, a variety of techniques may be used to choose appropriate orifice size. As noted above, a mock-up of an ultimate system may be made using adjustable valves in place of fixed orifice diverters. Adjustments may be made to optimize orifice sizes. The actual system may then be built using corresponding fixed orifices. Similarly, experimental diverter bodies configured to receive replaceable orifice disks may be used, with disks interchanged until the desired orifice size combinations are determined.

One or more embodiments of the present invention have been described. Nevertheless, it will be understood that various modifications may be made without departing from the spirit and scope of the invention. For example, the invention may be used with a variety of recirculating faucets or other dispensing/distribution devices. Additionally, various piping technologies may be used. Especially in retrofit situations, details of the existing system may influence details of any particular implementation. Accordingly, other embodiments are within the scope of the following claims.

What is claimed is:

1. A high purity water delivery system comprising:
   a reservoir (40) of purified water;
   a distribution line (42) extending downstream from an outlet (44) of the reservoir to a return (46) of the reservoir; and
   a plurality of delivery stations, each comprising:
      an outlet (54');
      a diverter (102; 102'; 102"; 102''') having:
         an upstream inlet port (104) along the distribution line;
         a downstream outlet port (106) along the distribution line;
         a supply port (108) downstream of the inlet port;
         a return port (110) downstream of the supply port; and
         a flow restriction (112; 112'; 216) between the supply port and return port; and
      a flow control valve (56') between: the outlet; and the supply port and the return port.

2. The system of claim 1 wherein:
   for at least two of the delivery stations:
      the outlet is a faucet outlet; and
      the flow restriction is a fixed orifice (112; 216).

3. The system of claim 2 wherein:
   for said at least two delivery stations:
      the flow restriction has an open area 40-60% of an internal area of piping of the distribution line.

4. The system of claim 3 wherein:
   the piping has an internal diameter of 25-60 mm.

5. The system of claim 3 wherein:
   the piping has an internal diameter of 40-57 mm.

6. The system of claim 2 wherein:
   for said at least two delivery stations:
      the orifice has a diameter of 30-35 mm with a piping OD of 50 mm.

7. The system of claim 2 wherein:
   for said at least two delivery stations:
      the orifice has a diameter of 35-39 mm with a piping OD of 63 mm.

8. The system of claim 2 wherein:
for said at least two delivery stations:
the orifice is in a polyvinylidene difluoride diverter body (212).

9. The system of claim 2 wherein:
for said at least two delivery stations:
the orifice is in a non-metallic diverter body (212).

10. The system of claim 1 wherein:
the system is a single-line system; and
for at least one of the delivery stations:
a recirculating loop (120) length is at least 2 m.

11. The system of claim 1 wherein:
for at least one of the delivery stations:
a recirculating loop (120) length is at least 5 m.

12. The system of claim 1 wherein:
for at least two of the delivery stations:
a recirculating loop (120) length is at least 5 m.

13. The system of claim 1 further comprising:
a pump (48) along the distribution line for driving a recirculating flow from the reservoir outlet and returning to the reservoir return.

14. The system of claim 13 further comprising:
a purification system (24) purifying water from a source (22) and delivering the purified water to the reservoir.

15. A method for retrofitting a high purity water delivery system (20) wherein the system has a system baseline configuration comprising:
a reservoir (40) of purified water;
a distribution line (42) extending downstream from an outlet (44) of the reservoir to a return (46) of the reservoir; and
a plurality of delivery stations (50), each comprising:
an outlet (54);
a dead leg from the distribution line; and
a flow control valve (56) between: the outlet; and distribution line,
the method comprising:
modifying or replacing the delivery stations to have, in a system retrofitted configuration:
an outlet (54');
a diverter (102; 102'; 102", 102''') along the distribution line having:
an upstream inlet port (104) along the distribution line;
a downstream outlet port (106) along the distribution line;
a supply port (108) downstream of the inlet port;
a return port (110) downstream of the supply port; and
a flow restriction (112; 112'; 216) between the supply port and return port; and
a flow control valve (56') between: the outlet; and the supply port and the return port.

16. The apparatus of claim 15 wherein:
the modifying or replacing comprises replacing a baseline faucet (52) having the baseline flow control valve with a recirculating retrofitted faucet (52') having the retrofitted flow control valve.

17. A method comprising:
purifying water;
directing a flow of the purified water downstream along a distribution line (42) extending from an outlet (44) of a reservoir the purified water to a return (46) of the reservoir; and
operating a plurality of delivery stations, each comprising:
an outlet (54'); and
a flow control valve (56') between the outlet and the distribution line, the operating comprising:
opening the flow control valve to deliver an outlet flow of the purified water from the outlet in an open condition; and
closing the valve to terminate the outlet flow in a closed condition,
wherein:
each of the delivery stations comprises:
a flow restriction (112, 112', 216) along the distribution line;
a supply branch (120-1) between the flow control valve and the distribution line upstream of the flow restriction; and
a return branch (120-2) between the flow control valve and the distribution line downstream of the flow restriction; and
in the open condition, a branch flow passes from the distribution line, through the supply branch and returning to the distribution line through the return branch.

18. The method of claim 17 wherein:
the flow control valve is a manual faucet valve.

19. The system of claim 18 wherein:
for at least one of the delivery stations:
a recirculating loop (120) length is at least 5 m.

20. The system of claim 17 wherein:
for at least one of the delivery stations:
a recirculating loop (120) length is at least 5 m.

* * * * *